United States Patent
Yaegashi et al.

(10) Patent No.: US 10,654,437 B2
(45) Date of Patent: May 19, 2020

(54) VEHICLE SEAT AND STAY CLOTH SEWING METHOD

(71) Applicant: NHK SPRING CO., LTD., Yokohama-shi, Kanagawa (JP)

(72) Inventors: Satoshi Yaegashi, Yokohama (JP); Tomoyuki Iyama, Yokohama (JP); Akihiko Hoshino, Yokohama (JP)

(73) Assignee: NHK SPRING Co., Ltd., Yokohama-shi, Kanagawa (JP)

( * ) Notice: Subject to any disclaimer, the term of this patent is extended or adjusted under 35 U.S.C. 154(b) by 37 days.

(21) Appl. No.: 16/017,027

(22) Filed: Jun. 25, 2018

(65) Prior Publication Data

US 2019/0001914 A1 Jan. 3, 2019

(30) Foreign Application Priority Data

Jun. 28, 2017 (JP) ................................ 2017-126687

(51) Int. Cl.
*B60R 21/2165* (2011.01)
*B60R 21/207* (2006.01)

(52) U.S. Cl.
CPC ........ *B60R 21/2165* (2013.01); *B60R 21/207* (2013.01); *B60R 2021/2078* (2013.01)

(58) Field of Classification Search
CPC .............. B60R 21/2165; B60R 21/207; B60R 2021/2078
See application file for complete search history.

(56) References Cited

U.S. PATENT DOCUMENTS

| 5,967,546 A | * | 10/1999 | Homier | B60N 2/5883 280/730.2 |
| 7,677,596 B2 | * | 3/2010 | Castro | B60R 21/207 280/728.2 |
| 2015/0054261 A1 | * | 2/2015 | Tanabe | B60R 21/207 280/728.2 |

FOREIGN PATENT DOCUMENTS

| JP | 2010-095019 A | 4/2010 |
| JP | 2011-121511 A | 6/2011 |
| WO | 2012/035619 A1 | 1/2014 |

OTHER PUBLICATIONS

Machine translation of foreign reference Shinya et al. JP2010095019 (Year: 2019).*
Notice of Reasons for Rejection for Application No. JP2017-126687, dated Jun. 12, 2018 in 7 pages (English translation provided).

* cited by examiner

*Primary Examiner* — Paul N Dickson
*Assistant Examiner* — Kurtis Nielson
(74) *Attorney, Agent, or Firm* — Knobbe, Martens, Olson & Bear, LLP

(57) ABSTRACT

In the state in which the first reinforcing cloth and the second reinforcing cloth are in loops, two end portions of the first reinforcing cloth are sewn to the first skin, and two end portions of the second reinforcing cloth are sewn to the second skin. Thus, the first reinforcing cloth and the second reinforcing cloth are sewn to the first skin and the second skin, respectively, in two-layer states.

7 Claims, 10 Drawing Sheets

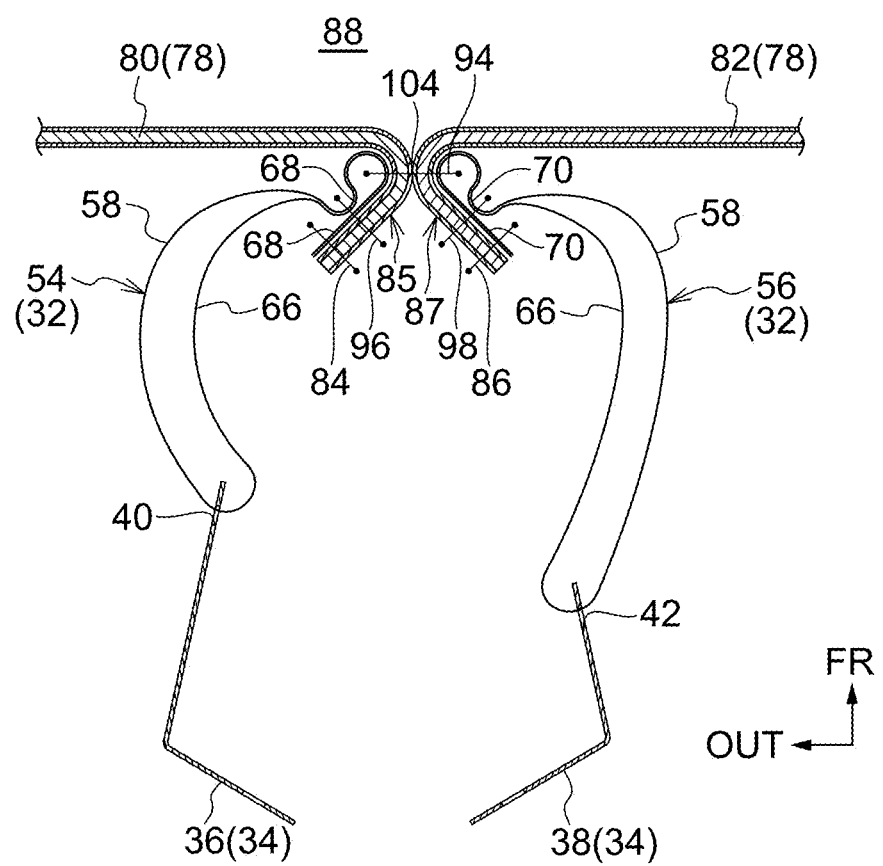

VEHICLE SEAT AND STAY CLOTH SEWING METHOD

CROSS-REFERENCE TO RELATED APPLICATION

This application is based on and claims priority under 35 USC 119 from Japanese Patent Application No. 2017-126687 filed on Jun. 28, 2017, the disclosure of which is incorporated by reference herein.

BACKGROUND

Technical Field

The present disclosure relates to a vehicle seat and to a stay cloth sewing method.

Related Art

A technology has been disclosed, for example, in Japanese Patent Application Laid-Open (JP-A) No. 2011-121511 in which an airbag is provided in a side portion disposed at a seat width direction outer side of a seat back of a vehicle seat. A frame forming a seat framework is provided inside the side portion of the vehicle seat. The frame is provided along a vertical direction in the side portion, and the airbag (below referred to as "the side airbag") is attached to the frame. A cushion member is provided at the front side of the side airbag, and the cushion member is covered by a skin member. A stay cloth is provided between the skin member and the cushion member. An inflation direction of the side airbag is regulated by the stay cloth.

Two of the stay cloths are constituted, at the inner side of the side portion and the outer side of the side portion. One end portion of the two stay cloths are passed through hole portions in a bracket fixed to the frame and are subsequently sewn to respective vicinities of the bracket. The other end portions of the two stay cloths are sewn to one another. The sewn portion at which the two stay cloths are sewn to one another serves as a weak portion, which ruptures when the side airbag inflates.

However, as side airbags have increased in size in recent years, expansion pressures of side airbags have been raised such that expansion can be completed quickly.

Consequently, there is a need to raise the strength of stay cloths.

SUMMARY

In consideration of the circumstances described above, an object of the present disclosure is to provide a vehicle seat and a stay cloth sewing method that improve the strength of a stay cloth.

A first aspect of the present disclosure provides a vehicle seat including:

a first skin that covers a surface at a seat width direction outer side of a side portion, the side portion being disposed at the seat width direction outer side of a seat back;

a second skin that covers a surface at a seat width direction inner side of the side portion, a seat width direction outer end portion of the second skin being sewn to a seat width direction inner end portion of the first skin at a first sewn portion;

a side airbag module accommodated in an interior of the side portion, the side airbag module being equipped with a side airbag that is supplied with gas and that inflates and expands toward the first sewn portion;

a first reinforcing cloth including
 a first superposed portion that is wrapped around a retaining member fixed at the interior of the side portion, formed into a loop and superposed, the first superposed portion being sewn together with the first skin at the first sewn portion, and
 a plurality of second sewn portions provided at the seat width direction inner end side of the first skin relative to the first sewn portion, the first reinforcing cloth being sewn to the first skin at a plurality of locations at the second sewn portions, the first reinforcing cloth transferring tension to the first sewn portion when the side airbag inflates and expands; and a second reinforcing cloth including
 a second superposed portion that is wrapped around the retaining member, formed into a loop and superposed, the second superposed portion being sewn together with the second skin at the first sewn portion, and
 a plurality of third sewn portions provided at the seat width direction outer end side of the second skin relative to the first sewn portion, the second reinforcing cloth being sewn to the second skin at a plurality of locations at the third sewn portions, the second reinforcing cloth transferring tension to the first sewn portion together with the first reinforcing cloth when the side airbag inflates and expands.

In the vehicle seat according to the first aspect of the present disclosure, the surface at the seat width direction outer side of the side portion disposed at the seat width direction outer side of the seat back is covered by the first skin, and the surface at the seat width direction inner side of the side portion is covered by the second skin. The seat width direction inner end portion of the first skin and the seat width direction outer end portion of the second skin are sewn together at the first sewn portion.

The side airbag module is accommodated inside the side portion. The side airbag module is equipped with the side airbag that is supplied with gas and inflates and expands toward the first sewn portion. When the side airbag is supplied with gas and inflates and expands, tension is transferred to the first sewn portion and the first sewn portion ruptures. The side airbag passes between the first reinforcing cloth and first skin and the second reinforcing cloth and second skin, and inflates and expands into the inside of a passenger compartment.

The retaining member is fixed at the interior of the side portion. The first reinforcing member and second reinforcing member that transfer tension to the first sewn portion when the side airbag is inflating and expanding are each wrapped around the retaining member. The first superposed portion of the first reinforcing cloth, which is formed into a loop and superposed, is sewn together with the first skin at the first sewn portion. Further to the seat width direction inner end side of the first skin relative to the first sewn portion, the plural second sewn portions are provided, at which the first reinforcing cloth is sewn to the first skin at plural locations. The second superposed portion of the second reinforcing cloth, which is formed into a loop and superposed, is sewn together with the second skin at the first sewn portion. Further to the seat width direction outer end side of the second skin relative to the first sewn portion, the plural third sewn portions are provided, at which the second reinforcing cloth is sew n to the second skin at plural locations.

That is, in the present disclosure, in the state in which the first reinforcing cloth and the second reinforcing cloth are in loops, two end portions of the first reinforcing cloth are sewn to the first skin, and two end portions of the second reinforcing cloth are sewn to the second skin. Thus, the first reinforcing cloth and the second reinforcing cloth are sewn to the first skin and the second skin, respectively, in two-layer states.

Therefore, strengths of the first reinforcing cloth and the second reinforcing cloth are improved compared to a structure in which a first reinforcing cloth and a second reinforcing cloth are sewn to a first skin and a second skin, respectively, in one-layer states. As a result, when the side airbag inflates and expands, an inflation direction of the side airbag may be regulated. Even when the expansion pressure of the side airbag is raised, the side airbag may be guided and expansion losses of the side airbag may be suppressed.

Moreover, both end portions of the first reinforcing cloth and the second reinforcing cloth are sewn to the first skin and the second skin, respectively. Therefore, strengths of the second sewn portions and the third sewn portions may be improved compared to a structure in which, for example, one end portions of a first reinforcing cloth and a second reinforcing cloth are sewn to a first skin and a second skin. Thus, even when the expansion pressure of the side airbag is raised, thread breakage at the second side portions and the third side portions may be suppressed.

A second aspect of the present disclosure provides the vehicle seat according to the first aspect, wherein:

the first reinforcing cloth and the second reinforcing cloth are each formed in a "U" shape in side view that is open at the side at which the retaining member is disposed; and the each reinforcing cloth including:

a main body portion formed in a rectangular shape;

a first projecting piece that projects from an upper portion of the main body portion and is superposed with the main body portion; and a second projecting piece that projects from a lower portion of the main body portion and is superposed with the main body portion.

In the vehicle seat according to the second aspect of the present disclosure, the first reinforcing cloth and the second reinforcing cloth are each formed in the "U" shape in side view, of which the side at which the retaining member is disposed is open. To describe this more specifically, the first reinforcing cloth and the second reinforcing cloth are each provided with the main body portion formed in the rectangular shape, and with the first projecting piece and second projecting piece that project from the upper portion and lower portion of the main body portion. The first projecting piece and the second projecting piece are each superposed with the main body portion.

Therefore, the strength of each reinforcing cloth may be improved compared to a structure in which only one projecting piece is provided, and when the side airbag is inflating and expanding, the side airbag may be guided more accurately.

A third aspect of the present disclosure provides the vehicle seat according to the first aspect, wherein the retaining member includes a first bracket, around which the first reinforcing cloth is wound, and a second bracket, around which the second reinforcing cloth is wound, the first bracket and the second bracket being joined to one another and integrated.

In the vehicle seat according to the third aspect of the present disclosure, the retaining member includes the first bracket around which the first reinforcing cloth is wrapped and the second bracket around which the second reinforcing cloth is wrapped, and the first bracket and second bracket are integrated by being joined to one another.

That is, when the first reinforcing cloth and the second reinforcing cloth are being wrapped around the first bracket and the second bracket, the first bracket and the second bracket are in a mutually separated state. Therefore, the first bracket and the second bracket are joined together after the first reinforcing cloth has been wrapped around the first bracket and the second reinforcing cloth has been wrapped around the second bracket. Consequently, sewing operations may be easier to perform and costs may be reduced.

A fourth aspect of the present disclosure provides a method of sewing a stay cloth, the method including:

wrapping a first reinforcing cloth according to the first aspect around a first bracket that is to be fixed at a seat width direction outer side of an interior of a side portion disposed at a seat width direction outer side of a seat back;

superposing a first superposed portion according to the first aspect of the first reinforcing cloth with a first skin according to the first aspect and sewing the first superposed portion and first skin to one another at a fourth sewn portion;

wrapping a second reinforcing cloth according to the first aspect around a second bracket that is to be fixed at the seat width direction inner side of the interior of the side portion; and superposing a second superposed portion according to the first aspect of the second reinforcing cloth with a second skin according to claim 1 and sewing the second superposed portion and second skin to one another at a fifth sewn portion.

In the first step of the stay cloth sewing method according to the fourth aspect of the present disclosure, the first reinforcing cloth is wrapped around the first bracket that is fixed at the seat width direction outer side of the interior of the side portion that is disposed at the seat width direction outer side of the seat back. In the second step, the first superposed portion of the first reinforcing cloth, at which the first reinforcing cloth is wrapped around, formed into a loop and superposed, is superposed with the first skin, and the first superposed portion and first skin are sewn to one another at the fourth sewn portion.

In the third step, the second reinforcing cloth is wrapped around the second bracket that is fixed at the seat width direction inner side of the interior of the side portion of the seat back. In the fourth step, the second superposed portion of the second reinforcing cloth, at which the second reinforcing cloth is wrapped around, formed into a loop and superposed, is superposed with the second skin, and the second reinforcing portion and second skin are sewn to one another at the fifth sewn portion.

That is, in the present disclosure, both end portions of the first reinforcing cloth are sewn together with the first skin and both end portions of the second reinforcing cloth are sewn together with the second skin in the state in which the first reinforcing cloth and the second reinforcing cloth are in loops. Thus, the first reinforcing cloth and the second reinforcing cloth are sewn to the first skin and the second skin, respectively, in two-layer states.

Therefore, strengths of the first reinforcing cloth and the second reinforcing cloth are improved compared to a structure in which a first reinforcing cloth and a second reinforcing cloth are sewn to a first skin and a second skin, respectively, in one-layer states. As a result, even when the expansion pressure of the side airbag is raised, the inflation direction of the side airbag may be regulated and expansion losses of the side airbag may be suppressed.

Note that although the operation of the second step is carried out after the operation of the first step and the operation of the fourth step is carried out after the operation of the third step, the terms "first step" and "third step" do not specifically indicate a sequence of these operations. The order of operations of the first step and the third step may be switched, or these steps may be performed substantially simultaneously. Similarly, the terms "sixth step" and "seventh step" described below do not specifically indicate a sequence of operations thereof.

A fifth aspect of the present disclosure provides the stay cloth sewing method according to the fourth aspect, further including sewing the first skin that has been sewn at the fourth sewn portion and the second skin that has been sewn at the fifth sewn portion to one another at a first sewn portion according to the first aspect.

In the fifth step of the stay cloth sewing method according to the fifth aspect of the present disclosure, the first skin that has been sewn at the fourth sewn portion and the second skin that has been sewn at the fifth sewn portion are sewn to one another at the first sewn portion. When the side airbag is supplied with gas and inflates and expands, tension is transferred to the first sewn portion and the first sewn portion ruptures.

A sixth aspect of the present disclosure provides the stay cloth sewing method according to the fifth aspect, further including:

sewing the first superposed portion to the first skin at a plurality of locations between the first sewn portion and the fourth sewn portion, at the second sewn portions according to the first aspect; and sewing the second superposed portion to the second skin at a plurality of locations between the first sewn portion and the fifth sewn portion, at the third sewn portions according to the first aspect.

In the sixth step of the stay cloth sewing method according to the sixth aspect of the present disclosure, the first skin and the first superposed portion are sewn together at plural locations at the second sewn portions, between the first sewn portion and the fourth sewn portion. In the seventh step, the second skin and the second superposed portion are sewn together at plural locations at the third sewn portions, between the first sewn portion and the fifth sewn portion.

Thus, because the first skin and first superposed portion are sewn together at plural locations at the second sewn portions and the second skin and second superposed portion are sewn together at plural locations at the third sewn portions, sewing strengths are improved compared to a structure in which these regions are sewn singly. Thus, even when the expansion pressure of the side airbag is raised, thread breakage at the sewn portions may be suppressed.

A seventh aspect of the present disclosure provides the stay cloth sewing method according to the sixth aspect, further including joining the first bracket and the second bracket to one another and integrating the first bracket and second bracket.

In the eighth step of the stay cloth sewing method according to the seventh aspect of the present disclosure, the first bracket and the second bracket are joined to one another and integrated. Thus, because the first bracket and second bracket are joined to one another after the first reinforcing cloth and the second reinforcing cloth have been suitably sewn, ease of operations is improved.

As described above, according to the vehicle seat of the first aspect of the present disclosure, strength of a stay cloth may be improved.

According to the vehicle seat of the second aspect of the present disclosure, when the side airbag is inflating and expanding, the side airbag may be accurately guided by the first reinforcing cloth and the second reinforcing cloth.

According to the vehicle seat of the third aspect of the present disclosure, ease of sewing operations may be improved, the work of sewing operations may be reduced, and costs may be lowered.

According to the stay cloth sewing method of the fourth aspect of the present disclosure, strengths of the first reinforcing cloth and the second reinforcing cloth may be improved compared to a structure in which a first reinforcing cloth and a second reinforcing cloth are sewn to a first skin and a second skin, respectively, in one-layer states.

According to the stay cloth sewing method of the fifth aspect of the present disclosure, the first sewn portion may be sewn to rupture when the side airbag is supplied with gas and inflates and expands.

According to the stay cloth sewing method of the sixth aspect of the present disclosure, because the first skin and first superposed portion are sewn together at plural locations at the second sewn portions and the second skin and second superposed portion are sewn together at plural locations at the third sewn portions, even when the expansion pressure of the side airbag is raised, thread breakage at the sewn portions may be suppressed.

According to the stay cloth sewing method of the seventh aspect of the present disclosure, ease of sewing operations may be improved and the work of sewing operations may be reduced.

BRIEF DESCRIPTION OF THE DRAWINGS

Exemplary embodiments of the present disclosure will be described in detail based on the following figures, wherein:

FIG. 7A is a sectional diagram showing the sequence of the stay cloth sewing method for the stay cloths sewn to the seat side portion of the vehicle seat according to the present exemplary embodiment;

DETAILED DESCRIPTION

Herebelow, a vehicle seat and a stay cloth sewing method according to an exemplary embodiment of the present disclosure are described while referring to the attached drawings. An arrow FR that is shown as appropriate in these drawings indicates a front side of the vehicle seat, an arrow UP indicates an upper side of the vehicle seat, and an arrow OUT indicates an outer side of the vehicle seat. In the following descriptions, where the terms front, rear, up, down, left and right are used without being particularly specified, the same refer to the front and rear in a front-and-rear direction of the vehicle seat, up and down in a vertical direction of the vehicle seat, and left and right in a left-and-right direction of the vehicle seat (a seat width direction).

—Structure of the Vehicle Seat—

First, structures of the vehicle seat according to the present exemplary embodiment are described.

Figure 1:
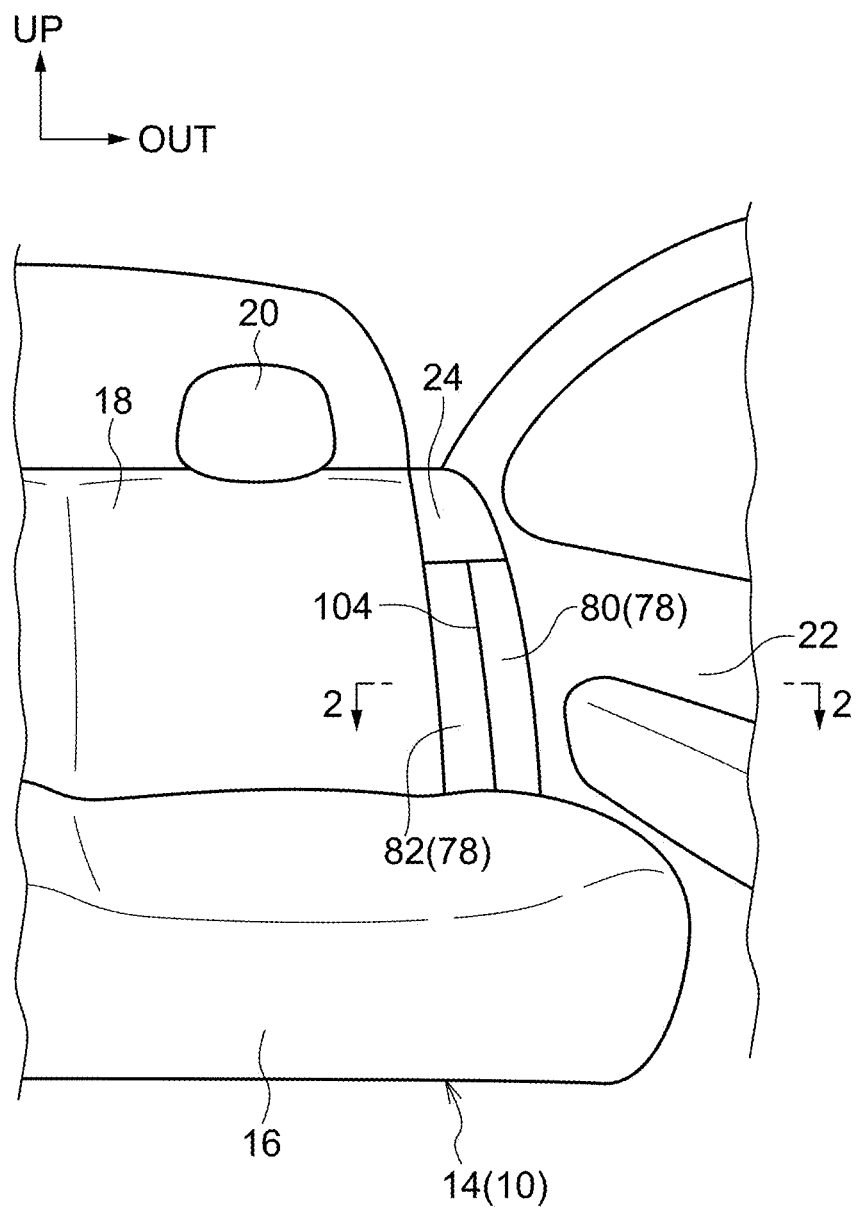
FIG. 1 is a perspective view, seen diagonally from a front side, showing a vehicle seat according to a present exemplary embodiment.

FIG. 1 is a perspective view in which a rear seat 14 employed as a vehicle seat 10 according to the present exemplary embodiment is seen diagonally from the front side. As shown in FIG. 1, the rear seat 14 includes a seat cushion 16 on which a vehicle occupant, who is not shown in the drawings, sits and a seat back 18 that supports the back area of the vehicle occupant. A headrest 20 that supports the head area of the vehicle occupant is provided at an upper end portion of the seat back 18.

Figure 3:
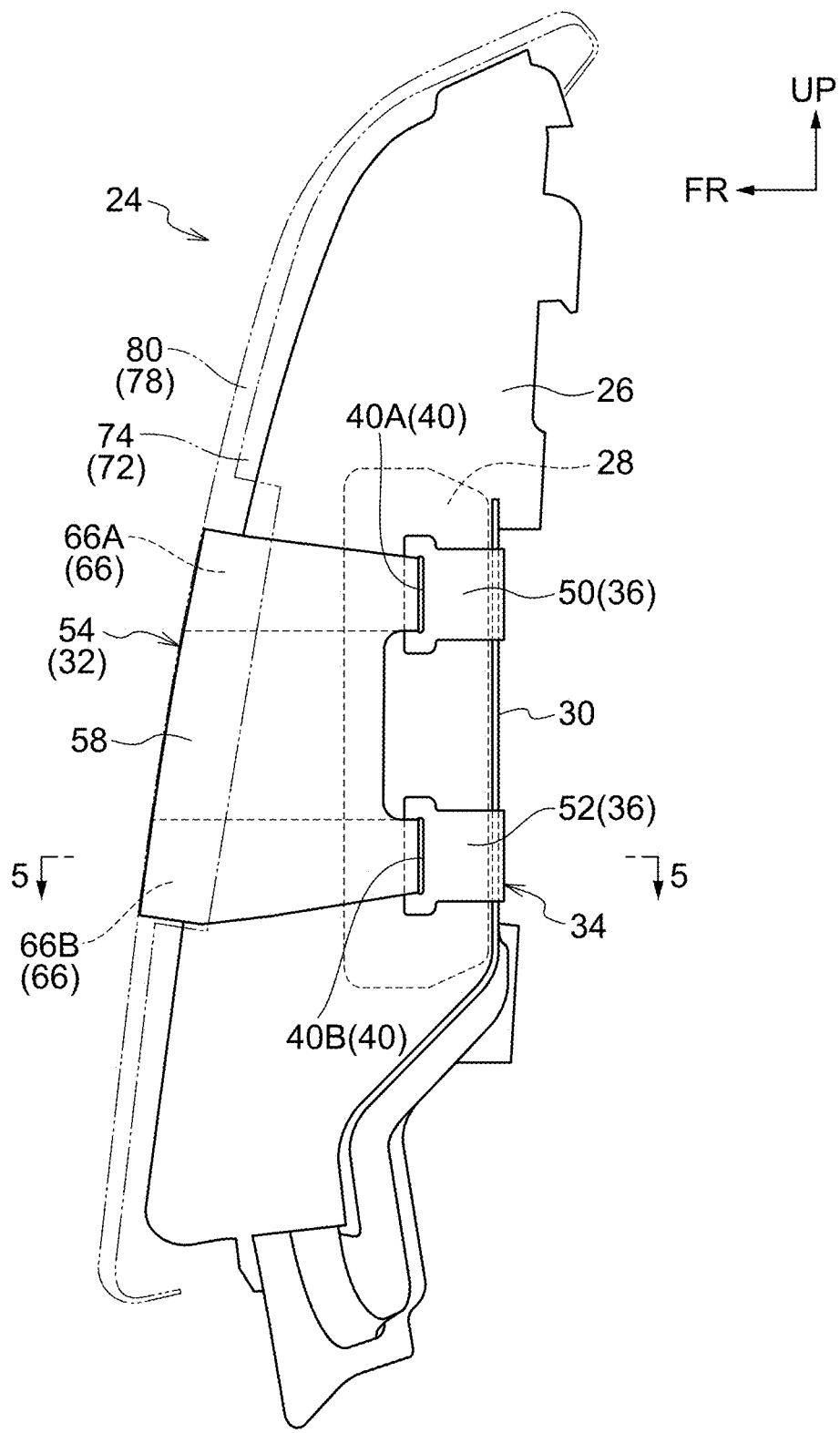
FIG. 3 is a schematic side view showing a seat side portion of the vehicle seat according to the present exemplary embodiment in a state seen from a seat width direction outer side.

A rear side door 22 is provided at a seat width direction outer side of the seat back 18 of the rear seat 14. A seat side portion 24 is provided between the rear side door 22 and the seat back 18. As shown in FIG. 3, a seat frame 26 is disposed along a vertical direction inside this seat side portion 24.

A cross-sectional shape of the seat frame 26 cut along the seat width direction forms a substantial "U" shape of which the front side is open. A side airbag module 28 is fixed to the seat frame 26. The side airbag module 28 is equipped with a side airbag 27 (represented by hatching). The side airbag 27 is capable of inflating and expanding when supplied with gas generated by an inflator 29.

A seat bracket 30 is fixed to the seat frame 26, and a stay cloth bracket 34 is attached to the seat bracket 30. A stay cloth 32 is wrapped around the stay cloth bracket 34. In plan view, the stay cloth bracket 34 is formed in a substantial "U" shape of which the front side is open. The stay cloth bracket 34 is located at the rear side of the seat frame 26 and is disposed so as to be front-and-rear superposed with the seat frame 26.

The stay cloth bracket 34 includes an outer bracket 36 and an inner bracket 38. In plan view, the outer bracket 36 structures the seat width direction outer side of the seat side portion 24 and is formed substantially in an "L" shape, and the inner bracket 38 structures the seat width direction inner side and is formed substantially in an inverted "L" shape.

Insertion holes 40 and 42 are formed in, respectively, one side 36A of the outer bracket 36 and one side 38A of the inner bracket 38, which oppose one another in the seat width direction. The stay cloth 32 can be inserted through the insertion holes 40 and 42. Fastening holes 46 and 48 are formed in, respectively, another side 36B of the outer bracket 36 and another side 38B of the inner bracket 38. The fastening holes 46 and 48 are disposed so as to be superposed with one another and a fastener 44 is fastened thereat.

As shown in FIG. 3, the outer bracket 36 is structured as an upper and lower pair of brackets that are, respectively, an upper portion bracket 50 and a lower portion bracket 52. The outer bracket 36 is shown in the drawings, and the inner bracket 38 has substantially the same structure as the outer bracket 36. Accordingly, the inner bracket 38 is not shown in the drawings.

Figure 2:
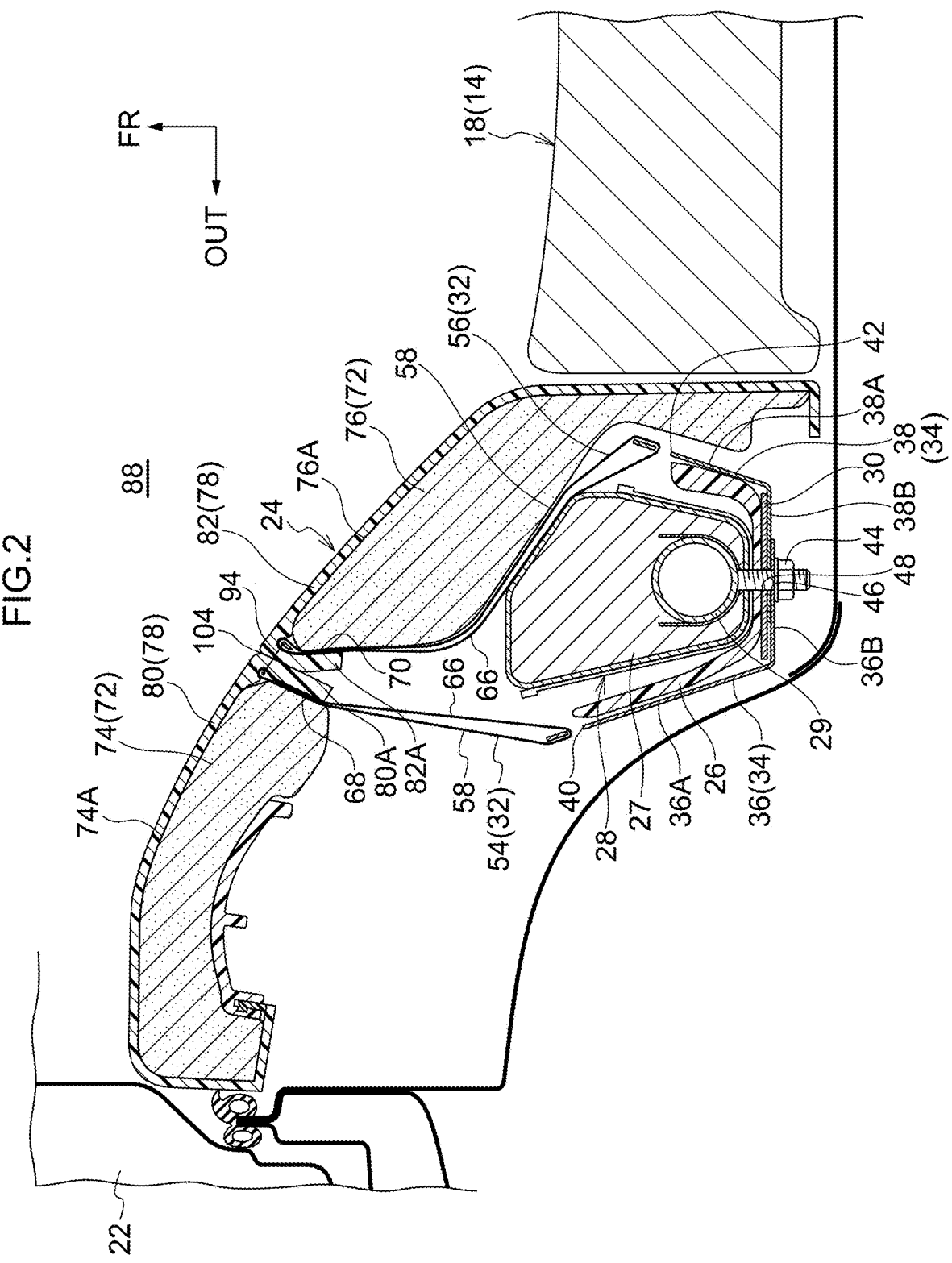
FIG. 2 is a sectional diagram cut along line 2-2 in FIG. 1.

As shown in FIG. 2, the stay cloth 32 is structured by an outer side stay cloth 54 (a first reinforcing cloth) and an inner side stay cloth 56 (a second reinforcing cloth). The outer side stay cloth 54 is wrapped around the outer bracket 36, and the inner side stay cloth 56 is wrapped around the inner bracket 38.

Figure 4:
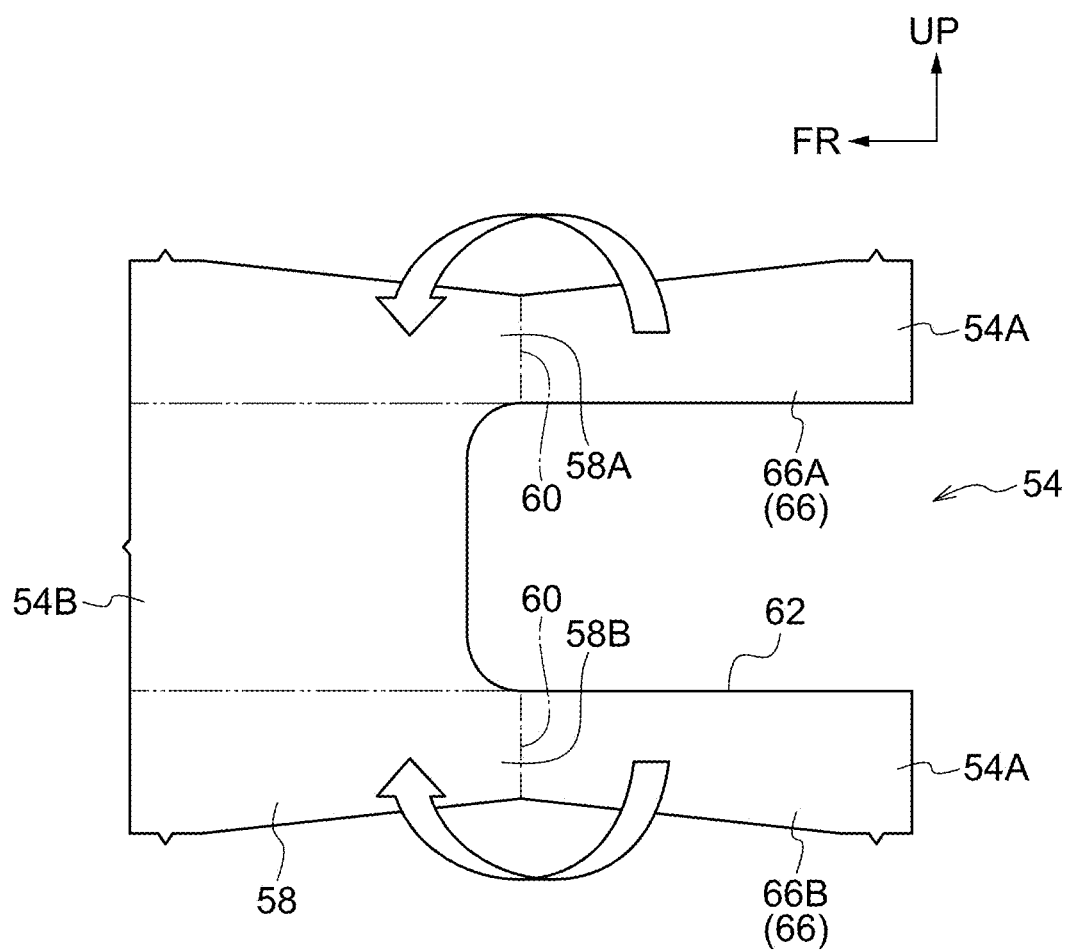
FIG. 4 is a side view showing stay cloths that are sewn to the seat side portion of the vehicle seat according to the present exemplary embodiment.

As shown in FIG. 4, in side view, the outer side stay cloth 54 is formed in a "U" shape that is open at the side thereof at which the stay cloth bracket 34 is disposed (see FIG. 3). The outer side stay cloth 54 is provided with a main body portion 58 formed in a rectangular shape. A foldback portion 60 is provided at a substantially central portion of a length direction of the outer side stay cloth 54 along the front-and-rear direction.

A cutaway portion 62 is formed in the outer side stay cloth 54 at a central portion in a width direction of the outer side stay cloth 54 along the vertical direction. The cutaway portion 62 is cut in a substantially rectangular shape into the foldback portion 60 from one end portion 54A of the length direction of the outer side stay cloth 54.

Thus, the outer side stay cloth 54 is structured by the rectangular main body portion 58, a foldback piece 66A (a first projecting piece), and a foldback piece 66B (a second projecting piece). The foldback piece 66A is formed in a substantially rectangular shape projecting from an upper portion 58A of the main body portion 58. The foldback piece 66B is formed in a substantially rectangular shape projecting from a lower portion 58B of the main body portion 58. The outer side stay cloth 54 is shown in the drawings, and the inner side stay cloth 56 has substantially the same structure as the outer side stay cloth 54. Accordingly, the inner side stay cloth 56 is not shown in the drawings.

As shown in FIG. 2 and FIG. 3, the foldback pieces 66A and 66B of the outer side stay cloth 54 are inserted through, respectively, an insertion hole 40A in the upper portion bracket 50 of the outer bracket 36 and an insertion hole 40B in the lower portion bracket 52, and are each folded back to the seat width direction inner side so as to form loops.

Figure 5:
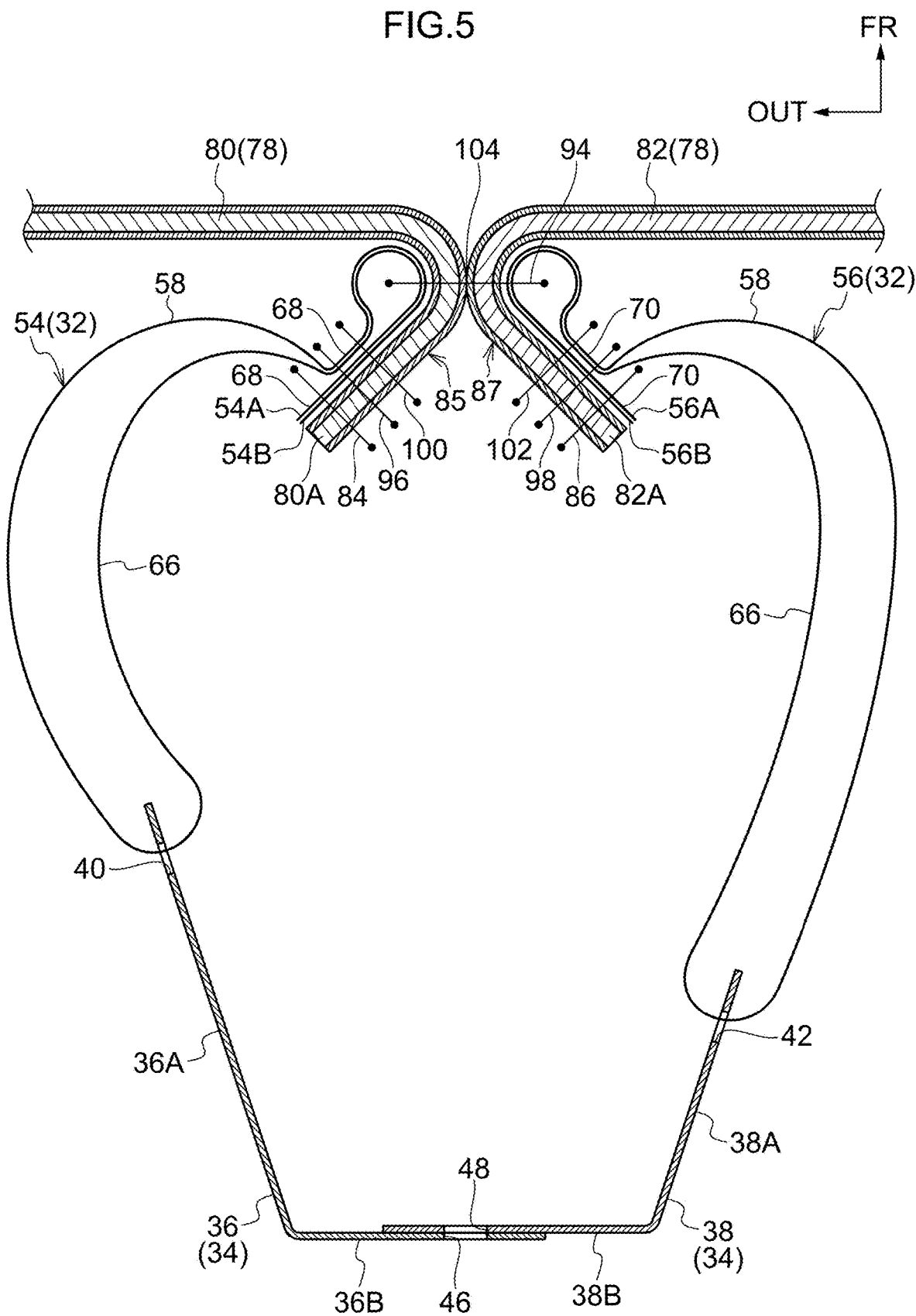
FIG. 5 is a sectional diagram cut along line 5-5 in FIG. 3, showing the stay cloths sewn to the seat side portion.

As shown in FIG. 3 to FIG. 5, the foldback pieces 66A and 66B of the outer side stay cloth 54 are each superposed with the main body portion 58. Thus, the one end portion 54A of the length direction of the outer side stay cloth 54 (at the side thereof at which the foldback pieces 66A and 66B are formed) is superposed with another end portion 54B of the length direction of the outer side stay cloth 54 (at the side at which the main body portion 58 is formed). Regions in which the one end portion 54A and another end portion 54B of the length direction of the outer side stay cloth 54 are superposed are referred to below as a superposed portion 68 (a first superposed portion) of the outer side stay cloth 54.

One end portion 56A and another end portion 56B of the inner side stay cloth 56 are also superposed in a similar manner to the outer side stay cloth 54. Regions in which the one end portion 56A and another end portion 56B of the length direction of the inner side stay cloth 56 are superposed are referred to below as a superposed portion 70 (a second superposed portion) of the inner side stay cloth 56.

As shown in FIG. 2, a pad 72 is provided at the front side of the side airbag 27 and the seat frame 26. The pad 72 includes an outer pad 74 that structures the seat width direction outer side of the seat side portion 24 and an inner pad 76 that structures the seat width direction inner side of the seat side portion 24. A surface 74A of the outer pad 74 and a surface 76A of the inner pad 76 are covered by a trim cover 78.

The trim cover 78 is structured by an outer cover 80 (a first skin) that is disposed at the seat width direction outer side and an inner cover 82 (a second skin) that is disposed at the seat width direction inner side. The surface 74A of the outer pad 74 is covered by the outer cover 80, and the surface 76A of the inner pad 76 is covered by the inner cover 82.

As shown in FIG. 5, the outer side stay cloth 54 is sewn to the outer cover 80 at a sewn portion 84 (a fourth sewn portion), a sewn portion 96 (second sewn portions) and a sewn portion 100 (the second sewn portions). The inner side stay cloth 56 is sewn to the inner cover 82 at a sewn portion 86 (a fifth sewn portion), a sewn portion 98 (third sewn portions) and a sewn portion 102 (the third sewn portions).

—Stay Cloth Sewing Method—

Now, the stay cloth sewing method according to the present exemplary embodiment is described.

Figure 6A:
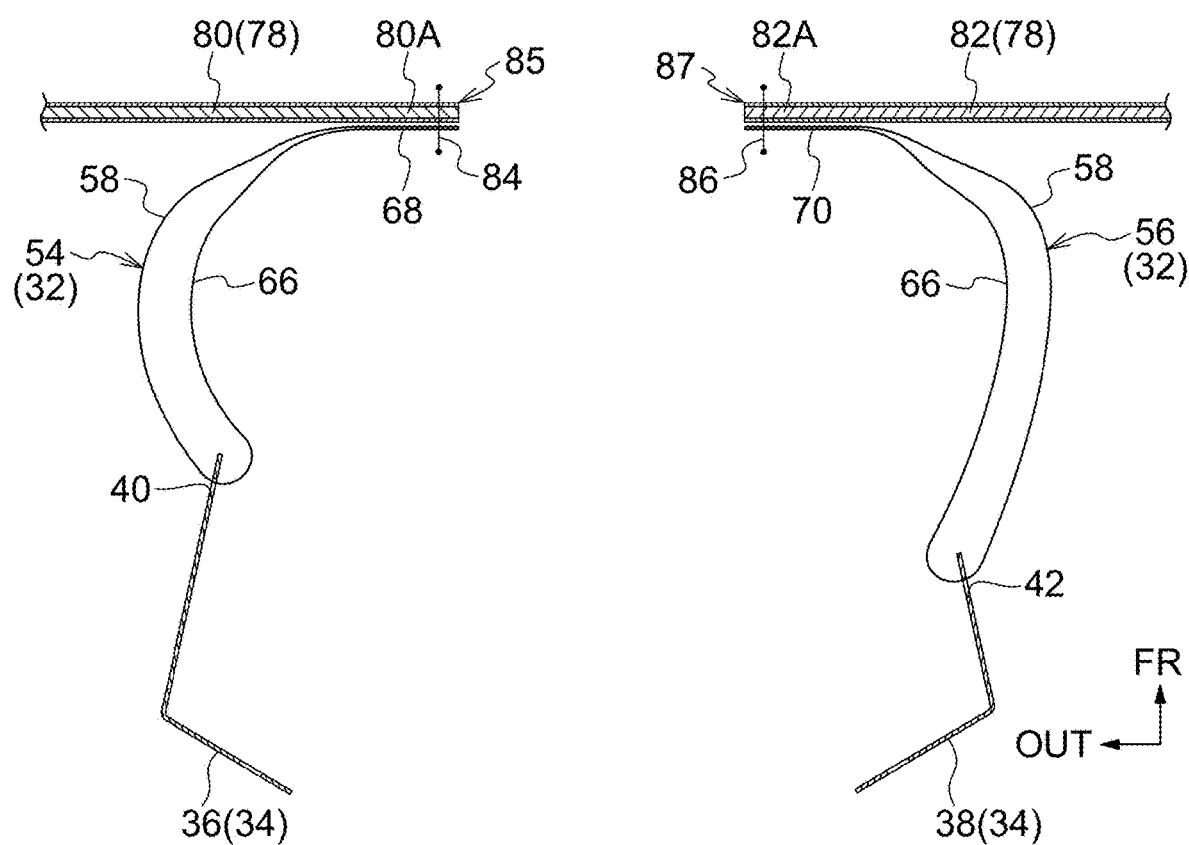
FIG. 6A is a sectional diagram showing a sequence of a stay cloth sewing method for the stay cloths sewn to the seat side portion of the vehicle seat according to the present exemplary embodiment.

Firstly, as shown in FIG. 6A, in a first step, the foldback pieces 66 of the outer side stay cloth 54 are wrapped around the insertion holes 40 formed in the outer bracket 36. In a second step, the superposed portion 68 of the outer side stay cloth 54 is sewn (at the sewn portion 84) to a seat width direction inner end portion 80A of the outer cover 80.

In a third step, the foldback pieces 66 of the inner side stay cloth 56 are wrapped around the insertion holes 42 formed in the inner bracket 38. In a fourth step, the superposed portion 70 of the inner side stay cloth 56 is sewn (at the sewn portion 86) to a seat width direction outer end portion 82A of the inner cover 82.

Thus, a sheaf portion 85 is formed by the outer cover 80 and the superposed portion 68 of the outer side stay cloth 54, including the sewn portion 84, and a sheaf portion 87 is formed by the inner cover 82 and the superposed portion 70 of the inner side stay cloth 56, including the sewn portion 86.

Figure 6B:
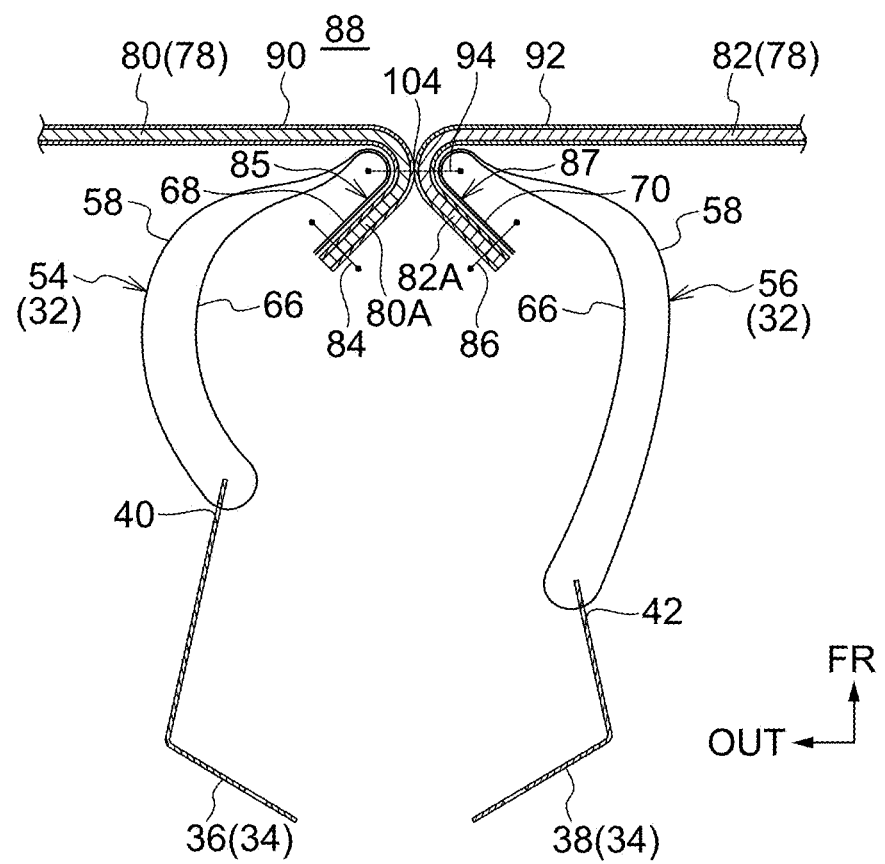
FIG. 6B is a sectional diagram showing the sequence of the stay cloth sewing method for the stay cloths sewn to the seat side portion of the vehicle seat according to the present exemplary embodiment.

A design portion 90 is exposed at the side of the outer cover 80 that faces a passenger compartment interior 88, and a design portion 92 is exposed at the side of the inner cover 82 that faces the passenger compartment interior 88. In a fifth step, as shown in FIG. 6B, the sheaf portion 85 and the sheaf portion 87 are disposed so as to oppose one another in the seat width direction, and are sewn together (at a sewn portion 94) at a location at which the side of the outer cover 80 at which the design portion 90 is disposed and the side of the inner cover 82 at which the design portion 92 is disposed are not exposed.

Figure 7B:
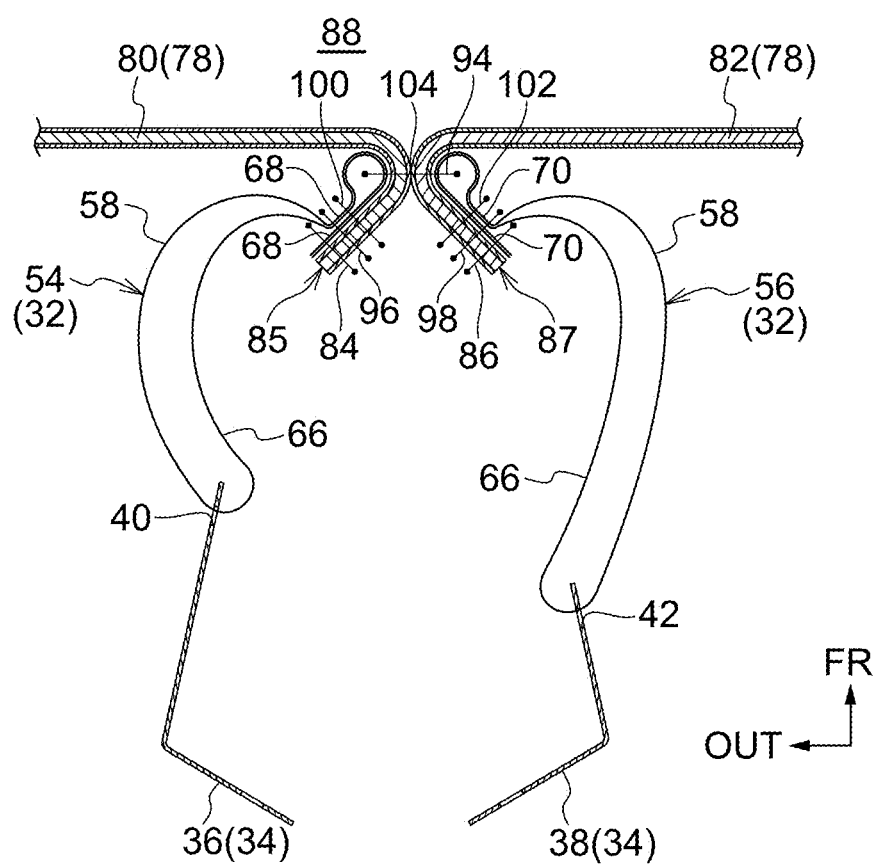
FIG. 7B is a sectional diagram showing the sequence of the stay cloth sewing method for the stay cloths sewn to the seat side portion of the vehicle seat according to the present exemplary embodiment.

In a sixth step, as shown in FIG. 7A, the superposed portion 68 of the outer side stay cloth 54 is superposed with and sewn to the sheaf portion 85 (at the sewn portion 96), between the sewn portion 84 and the sewn portion 94. Also in the sixth step, as shown in FIG. 7B, the superposed portion 68 of the outer side stay cloth 54 is superposed with and sewn to the sheaf portion 85 (at the sewn portion 100), between the sewn portion 96 and the sewn portion 94, in the same manner as the sewn portion 96.

In a seventh step, as shown in FIG. 7A, the superposed portion 70 of the inner side stay cloth 56 is superposed with and sewn to the sheaf portion 87 (at the sewn portion 98), between the sewn portion 86 and the sewn portion 94. Also in the seventh step, as shown in FIG. 7B, the superposed portion 70 of the inner side stay cloth 56 is superposed with and sewn to the sheaf portion 87 (at the sewn portion 102), between the sewn portion 98 and the sewn portion 94, in the same manner as the sewn portion 98.

As shown in FIG. 5 and FIG. 2, the fastener 44 is inserted into the fastener holes 46 and 48 in a state in which the another side 36B of the outer bracket 36 is superposed at the rear side with the other side 38B of the inner bracket 38, in which state the fastener 44 can be inserted into the fastening holes 46 and 48, and the outer bracket 36 and inner bracket 38 are fastened to the seat frame 26.

—Operation and Effects of the Vehicle Seat—

Now, operation and effects of the vehicle seat according to the present exemplary embodiment are described.

As shown in FIG. 2, at the seat side portion 24 disposed at the seat width direction outer side of the seat back 18 in the present exemplary embodiment, the inner end portion 80A of the outer cover 80 that covers the surface 74A of the outer pad 74 and the outer end portion 82A of the inner cover 82 that covers the surface 76A of the inner pad 76 are sewn together at the sewn portion 94 (the first sewn portion).

The side airbag 27 is accommodated in the interior of the seat side portion 24. When the side airbag 27 is being inflated and expanded by gas from the inflator 29, the side airbag 27 is guided toward the side thereof at which the sewn portion 94 is disposed by the outer side stay cloth 54 and the inner side stay cloth 56, tension is transferred to the sewn portion 94, the sewn portion 94 is ruptured (at a rupture portion 104), and the side airbag 27 expands toward the side thereof at which the passenger compartment interior 88 is disposed.

The outer bracket 36 and inner bracket 38 are fixed at the interior of the seat side portion 24, and the outer side stay cloth 54 and the inner side stay cloth 56, respectively, are wrapped around the outer bracket 36 and the inner bracket 38.

As shown in FIG. 5, the superposed portion 68 of the outer side stay cloth 54 that is formed into a loop and superposed is sewn together with the outer cover 80 at the sewn portion 84, and is sewn to the outer cover 80 at the plural sewn portions 96 and 100 between the sewn portion 84 and the sewn portion 94.

Meanwhile, the superposed portion 70 of the inner side stay cloth 56 that is formed into a loop and superposed is sewn together with the inner cover 82 at the sewn portion 86, and is sewn to the inner cover 82 at the plural sewn portions 98 and 102 between the sewn portion 86 and the sewn portion 94.

That is, in the present exemplary embodiment, in the state in which the outer side stay cloth 54 and the inner side stay cloth 56 are formed into loops, the two end portions 54A and 54B of the outer side stay cloth 54 are sewn to the outer cover 80 and the two end portions 56A and 56B of the inner side stay cloth 56 are sewn to the inner cover 82. Thus, the outer side stay cloth 54 and the inner side stay cloth 56 are sewn to the outer cover 80 and the inner cover 82, respectively, in two-layer states.

Therefore, strengths of the outer side stay cloth 54 and the inner side stay cloth 56 may be improved compared to a structure in which the outer side stay cloth 54 and inner side stay cloth 56 are sewn to the outer cover 80 and inner cover 82, respectively, in one-layer states.

Figure 8:
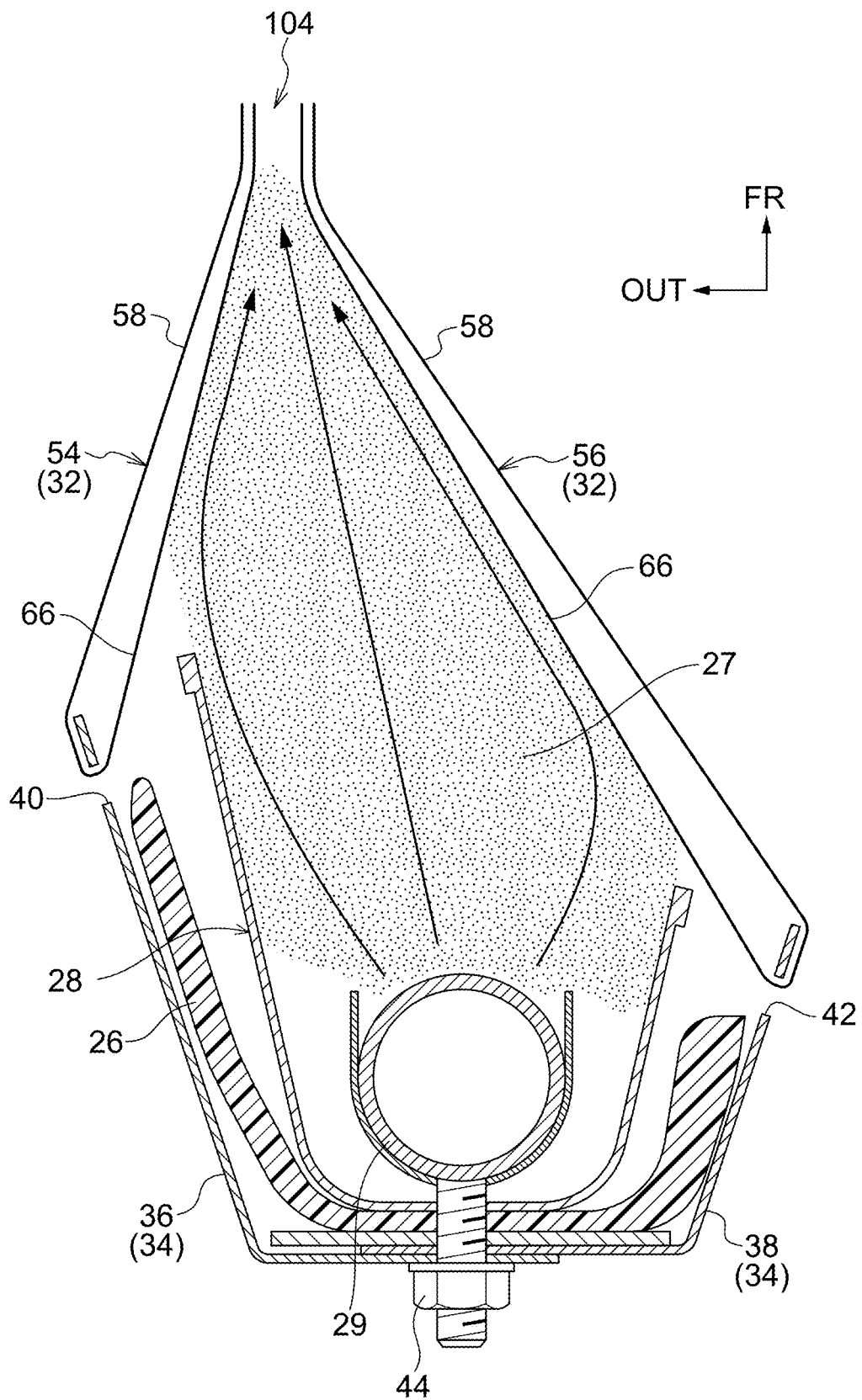
FIG. 8 is a sectional diagram for describing operation of the stay cloths sewn to the seat side portion of the vehicle seat according to the present exemplary embodiment.

Hence, as shown in FIG. 8, when the side airbag 27 is inflating and expanding, the inflation direction of the side airbag 27 may be regulated and, even when the expansion pressure of the side airbag 27 is raised, the side airbag 27 may be guided and expansion losses of the side airbag 27 may be suppressed.

As shown in FIG. 5, the two end portions 54A and 54B of the outer side stay cloth 54 are sewn to the outer cover 80, and the two end portions 56A and 56B of the inner side stay cloth 56 are sewn to the inner cover 82.

Therefore, strengths of the sewn portions 96 and 100 and the sewn portions 98 and 102 may be improved compared to, for example, a structure in which the one end portions 54A and 56A of the outer side stay cloth 54 and the inner side stay cloth 56 are sewn to, respectively, the outer cover 80 and the inner cover 82, which structure is not shown in the drawings. Thus, even when the expansion pressure of the side airbag 27 is raised, thread breakage at the sewn portions 96 and 100 and the sewn portions 98 and 102 may be suppressed.

In the present exemplary embodiment, as shown in FIG. 3 and FIG. 4, the outer side stay cloth 54 and the inner side stay cloth 56 are each formed in a "U" shape in side view that is open at the side thereof at which the stay cloth bracket 34 is disposed, and provided with the main body portion 58 formed in a rectangular shape. The foldback pieces 66A and 66B project from the upper portion 58A and lower portion 58B, respectively, of the main body portion 58.

Therefore, strengths of the outer side stay cloth 54 and the inner side stay cloth 56 may be improved compared to a structure in which only one projecting piece is provided, which is not shown in the drawings. In addition, when the side airbag 27 is inflating and expanding, the side airbag 27 may be guided accurately.

In the present exemplary embodiment, as shown in FIG. 5, the stay cloth bracket 34 includes the outer bracket 36 around which the outer side stay cloth 54 is wrapped and the inner bracket 38 around which the inner side stay cloth 56 is wrapped, and the outer bracket 36 and inner bracket 38 are integrated by being joined to one another.

That is, when the outer side stay cloth 54 and inner side stay cloth 56 are being wrapped around the outer bracket 36 and inner bracket 38, the outer bracket 36 and the inner bracket 38 are in a mutually separated state. Therefore, because it is sufficient for the outer bracket 36 and inner bracket 38 to be joined together after respective operations to wrap the outer side stay cloth 54 around the outer bracket 36 and wrap the inner side stay cloth 56 around the inner bracket 38, sewing operations may be easier to perform and costs may be reduced.

In the present exemplary embodiment, as shown in FIG. 6A and FIG. 6B, the superposed portion 68, at which the outer side stay cloth 54 is wrapped around, formed into a loop and superposed, is superposed with the outer cover 80 that covers the surface 74A of the outer pad 74 (see FIG. 2), and the superposed portion 68 and outer cover 80 are joined to one another at the sewn portion 84. In addition, the superposed portion 70, at which the inner side stay cloth 56 is wrapped around, formed into a loop and superposed, is superposed with the inner cover 82 that covers the surface 76A of the inner pad 76 (see FIG. 2), and the superposed portion 70 and inner cover 82 are joined to one another at the sewn portion 86.

That is, in the present exemplary embodiment, the two end portions 54A and 54B of the outer side stay cloth 54 are sewn together with the outer cover 80 and the two end portions 56A and 56B of the inner side stay cloth 56 are sewn together with the inner cover 82 in the state in which the outer side stay cloth 54 and the inner side stay cloth 56 are formed into loops. Thus, the outer side stay cloth 54 and the inner side stay cloth 56 are sewn to the outer cover 80 and the inner cover 82, respectively, in two-layer states.

In the present exemplary embodiment, as shown in FIG. 7A and FIG. 7B, the superposed portion 68 of the outer side stay cloth 54 is superposed with the sheaf portion 85 and sewn together at the sewn portions 96 and 100 between the sewn portion 84 and the sewn portion 94, and the superposed portion 70 of the inner side stay cloth 56 is superposed with the sheaf portion 87 and sewn together at the sewn portions 98 and 102 between the sewn portion 86 and the sewn portion 94.

Thus, because the outer cover 80 and the superposed portion 68 are sewn together at plural locations at the sewn portions 96 and 100, and the inner cover 82 and the superposed portion 70 are sewn together at plural locations at the sewn portions 98 and 102, sewing strengths may be improved compared to a structure in which these regions are sewn singly. Even when the expansion pressure of the side airbag 27 is raised, thread breakage at the sewn portions 96 and 100 and the sewn portions 98 and 102 may be suppressed.

In the present exemplary embodiment, as shown in FIG. 5, the outer bracket 36 and inner bracket 38 are integrated by being joined to one another. Thus, because the outer bracket 36 and inner bracket 38 are joined together after respective operations to wrap the outer side stay cloth 54 around the outer bracket 36 and wrap the inner side stay cloth 56 around the inner bracket 38, sewing operations may be made easier.

In the present exemplary embodiment, as described above, the inner side stay cloth 56 has substantially the same structure as the outer side stay cloth 54. Because the inner side stay cloth 56 and the outer side stay cloth 54 are formed with substantially the same sizes, as shown in FIG. 2, the inner side stay cloth 56 and outer side stay cloth 54 may cover outer sides of the side airbag module 28 substantially equally at the left and right in the seat width direction. Furthermore, because the inner side stay cloth 56 and the outer side stay cloth 54 are formed with substantially the same sizes, the inner side stay cloth 56 and the outer side stay cloth 54 may be provided with substantially the same strengths. Hence, as shown in FIG. 8, when the side airbag 27 is inflating and expanding, shifting in the seat width direction may be suppressed and expansion losses of the side airbag 27 may be reduced.

The present exemplary embodiment is described in relation to the rear seat 14 but is also applicable at a front seat side (not shown in the drawings).

Hereabove, the present disclosure has been described in accordance with the exemplary embodiment, but the present disclosure is not limited by this exemplary embodiment. The exemplary embodiment and various variant examples may be used in suitable combinations, and it will be clear that numerous modes may be embodied within a technical scope not departing from the gist of the present disclosure.

What is claimed is:

1. A vehicle seat comprising:
   a first skin that covers a surface at a seat width direction outer side of a side portion, the side portion being disposed at the seat width direction outer side of a seat back;
   a second skin that covers a surface at a seat width direction inner side of the side portion, a seat width direction outer end portion of the second skin being sewn to a seat width direction inner end portion of the first skin at a first sewn portion;
   a side airbag module accommodated in an interior of the side portion, the side airbag module being equipped with a side airbag that is supplied with gas and that inflates and expands toward the first sewn portion;
   a first reinforcing cloth including a first superposed portion that is wrapped around a retaining member fixed at the interior of the side portion, folded back to be formed into a loop and two end portions of the length direction of the first reinforcing cloth being superposed, the first superposed portion being sewn together with the first skin at the first sewn portion, and a plurality of second sewn portions provided at the seat width direction inner end side of the first skin relative to the first sewn portion, the first reinforcing cloth being sewn to the first skin at a plurality of locations at the second sewn portions, the first reinforcing cloth transferring tension to the first sewn portion when the side airbag inflates and expands; and a second reinforcing cloth including a second superposed portion that is wrapped around the retaining member, folded back to be formed into a loop and two end portions of the length direction of the second reinforcing cloth being superposed, the second superposed portion being sewn together with the second skin at the first sewn portion, and a plurality of third sewn portions provided at the seat width direction outer end side of the second skin relative to the first sewn portion, the second reinforcing cloth being sewn to the second skin at a plurality of locations at the third sewn portions, the second reinforcing cloth transferring tension to the first sewn portion together with the first reinforcing cloth when the side airbag inflates and expands.

2. The vehicle seat according to claim 1, wherein:

the first reinforcing cloth and the second reinforcing cloth are each formed in a "U" shape in side view that is open at the side at which the retaining member is disposed; and the each reinforcing cloth including:

a main body portion formed in a rectangular shape;

a first projecting piece that projects from an upper portion of the main body portion and is superposed with the main body portion; and a second projecting piece that projects from a lower portion of the main body portion and is superposed with the main body portion.

3. The vehicle seat according to claim 1, wherein the retaining member includes a first bracket, around which the first reinforcing cloth is wound, and a second bracket, around which the second reinforcing cloth is wound, the first bracket and the second bracket being joined to one another and integrated.

4. A method of sewing a stay cloth to the vehicle seat according to claim 1, the method comprising:

wrapping the first reinforcing cloth around a first bracket that is to be fixed at the seat width direction outer side of the interior of the side portion disposed at the seat width direction outer side of the seat back;

superposing the first superposed portion of the first reinforcing cloth with the first skin and sewing the first superposed portion and the first skin to one another at a fourth sewn portion;

wrapping the second reinforcing cloth around a second bracket that is to be fixed at the seat width direction inner side of the interior of the side portion; and superposing the second superposed portion of the second reinforcing cloth with the second skin and sewing the second superposed portion and the second skin to one another at a fifth sewn portion.

5. The stay cloth sewing method according to claim 4, further comprising sewing the first skin that has been sewn at the fourth sewn portion and the second skin that has been sewn at the fifth sewn portion to one another at the first sewn portion.

6. The stay cloth sewing method according to claim 5, further comprising:

sewing the first superposed portion to the first skin at a plurality of locations between the first sewn portion and the fourth sewn portion, at the second sewn portions; and sewing the second superposed portion to the second skin at a plurality of locations between the first sewn portion and the fifth sewn portion, at the third sewn portions.

7. The stay cloth sewing method according to claim 6, further comprising joining the first bracket and the second bracket to one another and integrating the first bracket and second bracket.

\* \* \* \* \*